（12）United States Patent
Li et al.

(10) Patent No.: US 9,207,744 B2
(45) Date of Patent: Dec. 8, 2015

(54) METHOD AND APPARATUS FOR ADJUSTING DEVICE POWER CONSUMPTION

(71) Applicant: Huawei Technologies Co., Ltd., Shenzhen (CN)

(72) Inventors: Yansong Li, Shenzhen (CN); Jiangtao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 14/088,880

(22) Filed: Nov. 25, 2013

(65) Prior Publication Data
US 2014/0115357 A1    Apr. 24, 2014

Related U.S. Application Data

(63) Continuation of application No. PCT/CN2013/074840, filed on Apr. 27, 2013.

(30) Foreign Application Priority Data

Oct. 18, 2012    (CN) .......................... 2012 1 0397346

(51) Int. Cl.
G06F 1/32    (2006.01)
(52) U.S. Cl.
CPC ............ *G06F 1/3234* (2013.01); *G06F 1/3206* (2013.01)
(58) Field of Classification Search
CPC ..................................................... G06F 1/3203
USPC ......................................................... 713/320
See application file for complete search history.

(56) References Cited

U.S. PATENT DOCUMENTS 7,155,623 B2 *  12/2006  Lefurgy et al. ............... 713/324
8,006,108 B2     8/2011   Brey et al.
(Continued)

FOREIGN PATENT DOCUMENTS

CN    101430595 A    5/2009
CN    102096460 A    6/2011
(Continued)

OTHER PUBLICATIONS

Foreign Communication From a Counterpart Application, European Application No. 13782927.1 Extended European Search Report dated Dec. 4, 2014, 9 pages.
(Continued)

*Primary Examiner* — Suresh Suryawanshi
(74) *Attorney, Agent, or Firm* — Conley Rose, P.C.; Grant Rodolph; Nicholas K. Beaulieu

(57) ABSTRACT

The present invention discloses a method for adjusting device power consumption including: grouping multiple devices into at least one device group, setting a group power consumption ceiling threshold (PCCT) for the device group, and setting a device PCCT for each device in the group; obtaining current total power consumption of the group, and when the current total power consumption of the group exceeds the group PCCT, determining whether current power consumption of each device in the group exceeds the device PCCT of the device; when the current power consumption of each device exceeds the device PCCT of the device, reducing power consumption of each device to the device PCCT of the device; and when current power consumption of a device exceeds a device PCCT of the device, setting a new PCCT for the device, and reducing power consumption of the device to/or less than the new PCCT.

18 Claims, 2 Drawing Sheets

(56) References Cited

U.S. PATENT DOCUMENTS

| | | |
|---|---|---|
| 8,145,927 B2 * | 3/2012 | Okitsu et al. .................. 713/320 |
| 8,843,772 B2 * | 9/2014 | Hormuth ....................... 713/300 |
| 2007/0300083 A1 | 12/2007 | Goodrum et al. |
| 2009/0125737 A1 | 5/2009 | Brey et al. |
| 2011/0087906 A1 | 4/2011 | Iljima et al. |
| 2011/0144818 A1 | 6/2011 | Li et al. |
| 2012/0030493 A1 | 2/2012 | Cepulis et al. |

FOREIGN PATENT DOCUMENTS

| | | |
|---|---|---|
| CN | 102395937 A | 3/2012 |
| CN | 102916835 A | 2/2013 |
| WO | 2008088951 A1 | 7/2008 |

OTHER PUBLICATIONS

Foreign Communication From a Counterpart Application, PCT Application No. PCT/CN2013/074840, English Translation of International Search Report dated Aug. 1, 2013, 13 pages.

Foreign Communication From a Counterpart Application, PCT Application No. PCT/CN2013/074840, English Translation of Written Opinion dated Aug. 1, 2013, 2 pages.

* cited by examiner

METHOD AND APPARATUS FOR ADJUSTING DEVICE POWER CONSUMPTION

CROSS-REFERENCE TO RELATED APPLICATIONS

This application is a continuation of International Application No. PCT/CN2013/074840, filed on Apr. 27, 2013, which claims priority to Chinese Patent Application No. 201210397346.0, filed on Oct. 18, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and an apparatus for adjusting power consumption of a communications device.

BACKGROUND

Nowadays, with the development of services such as Internet and mobile broadband services, operators need to constantly purchase new devices to expand system capacity and enhance processing capabilities. However, the area, power supply, and heat dissipation capabilities of an equipment room are limited. With a continuous increase of devices, total power consumption of the devices keeps increasing, causing a serious limitation on device density and space utilization in the equipment room. Generally, power consumption of a communications device varies dynamically according to a load: When the load increases and a processor utilization rate rises, device power consumption increases; and when the load decreases and the processor is relatively idle, the device power consumption decreases. At present, two types of power consumption are generally set for a communications device: maximum power consumption and typical power consumption. The maximum power consumption is power consumed by a device when the load is the heaviest and/or the ambient temperature reaches an upper limit, and the typical power consumption is power consumed by the device under a typical load and a rated temperature.

In a practical operation process, multiple devices usually form a device group, and a certain power budget is allocated to the device group; in addition, a circuit breaker is used to provide overcurrent protection, and the number of devices that can be supported is calculated according to power consumption of each device in the device group. Under such circumstances, the power consumption of each device is generally calculated according to the maximum power consumption. For example, if the maximum power consumption of each device is 300 watts (W) and the typical power consumption thereof is 200 W, a 3000 W budget supports only 10 devices. However, the maximum power is seldom reached. Therefore, the foregoing configuration mode supports only a small number of devices and leads to a waste of precious equipment room space. In addition, the power supply system that supplies power to a rack is lightly loaded, which leads to a relatively low efficiency. If the configuration is based on the typical power consumption, 15 devices are supported, which improves space utilization of the rack; however, if the load of a device rises abruptly or the ambient temperature rises as a result of a fault in an air conditioner in the equipment room, power consumption of the device may approach the maximum value and overcurrent protection of the circuit breaker may be triggered, which leads to power-off of all communications devices and affects normal service processing.

For such problems, a power consumption limiting technology is put forward in the prior art: The power budget of each group of devices is allocated to each device in the group, the power allocated to each device is used as a power ceiling value of the device, and a baseboard management controller (BMC) of the device detects current device power consumption in real time; after detecting that power consumption of a device exceeds the ceiling value of the device, the BMC reduces a dominant frequency or a core voltage of a processor in the device, shuts down a functional module, or takes other measures, so as to reduce the power consumption of the device to less than the ceiling value, which ensures that total power consumption of all devices is lower than the power budget, avoids overcurrent protection of the circuit breaker, and reduces adverse effects on device performance; and after service processing is completed and the power consumption is reduced to a certain extent, the limiting operation stops, and the initial performance of the processor is restored.

With the power consumption limiting technology, a power consumption detection and a limiting operation of each device are independent from each other, and the management is relatively simple; however, if power consumption of a device exceeds the power consumption ceiling value while other devices are far from reaching their ceiling values, power consumption of the entire device group does not reach the budget value, which leads to relatively low utilization of resources. In addition, a ceiling value of each device must be set as accurately as possible. A relatively high ceiling value leads to a waste of resources, and a relatively low ceiling value leads to frequent limiting, affecting performance of the device.

SUMMARY

Therefore, the present invention provides a method and an apparatus for adjusting power consumption of a communications device to fully use a power budget of the device and give full play to device performance.

To solve the problems, embodiments of the present invention provide the following technical solutions:

According to a first aspect, an embodiment provides a possible solution of a method for adjusting device power consumption, including: grouping multiple devices into at least one device group, setting a group power consumption ceiling threshold for the device group, and setting a device power consumption ceiling threshold for each device in the device group; obtaining current total power consumption of the device group, and when the current total power consumption of the device group exceeds the group power consumption ceiling threshold, determining whether current power consumption of each device in the device group exceeds the device power consumption ceiling threshold of the device; when the current power consumption of each device in the device group exceeds the device power consumption ceiling threshold of the device, reducing power consumption of each device to the device power consumption ceiling threshold of the device; and when current power consumption of a device in the device group exceeds a device power consumption ceiling threshold of the device, setting a new power consumption ceiling threshold for the device whose power consumption exceeds the device power consumption ceiling threshold, and reducing power consumption of the device whose power consumption exceeds the device power consumption ceiling threshold to the new power consumption ceiling threshold or less than the new power consumption ceiling threshold.

In a first possible implementation of the first aspect, a system management module (SMM) in the device group is used to set the group power consumption ceiling threshold of the device group, and a BMC of each device in the device group is used to set the device power consumption ceiling threshold for the device.

In a second possible implementation of the first aspect, the obtaining current total power consumption of the device group specifically includes: using an SMM in the device group to detect a value of an electric current that passes through a circuit breaker, and obtaining the current total power consumption of the device group by a calculation according to the electric current value.

In a third possible implementation of the first aspect, the obtaining current total power consumption of the device group specifically includes: establishing a communications connection to a BMC of each device in the device group, reading the current power consumption of each device in the device group from the BMC, and obtaining the current total power consumption of the device group by accumulating the current power consumption of each device.

In a fourth possible implementation of the first aspect, the new power consumption ceiling threshold of the device whose power consumption exceeds the device power consumption ceiling threshold is obtained by a calculation by using a formula $X_i = Y_i + P_i * Q/P$, where $Y_i$ is an original device power consumption ceiling threshold of device i, $P_i$ is a difference between current power consumption of device i and the original device power consumption ceiling threshold, $i=1, 2, \ldots, m$, P is a sum of power consumption excesses of m devices whose current power consumption exceeds a device power consumption ceiling threshold of the m devices, $P=P_1+P_2+ \ldots +P_m$, Q is a sum of power consumption shortfalls of n devices whose current power consumption is less than a device power consumption ceiling threshold of the n devices, $Q=Q_1+Q_2+\ldots+Q_n$, $Q_j$ is a difference between the original device power consumption ceiling threshold of device j and the current power consumption, and $j=1, 2, \ldots, n$.

In a fifth possible implementation of the first aspect, the method further includes: when the current power consumption of a device in the device group exceeds a device power consumption ceiling threshold of the device, setting a new power consumption ceiling threshold for a remaining device to current power consumption of the remaining device.

With reference to any one of the possible implementations of the first aspect, in a sixth possible implementation of the first aspect, after setting a new power consumption ceiling threshold for the device, the method further includes: setting a second power consumption ceiling threshold for the device group and detecting current total power consumption of the device group; and when the current total power consumption of the device group is less than or equal to the second power consumption ceiling threshold, terminating a power consumption adjustment operation.

With reference to any one of the possible implementations of the first aspect, in a seventh possible implementation of the first aspect, the method further includes: setting a limiting switch separately for each device in the device group; and when current power consumption of a device in the device group exceeds a device power consumption ceiling threshold of the device, triggering a limiting switch of the device to perform a power consumption adjustment operation.

According to a second aspect, an embodiment provides a possible solution of an apparatus for adjusting device power consumption, including a setting unit, a detecting unit, and an adjusting unit, where: the setting unit is configured to group multiple devices into at least one device group, set a group power consumption ceiling threshold for the device group, and set a device power consumption ceiling threshold for each device in the device group; the detecting unit is configured to obtain current total power consumption of the device group, and when the current total power consumption of the device group exceeds the group power consumption ceiling threshold set by the setting unit, determine whether current power consumption of each device in the device group exceeds the device power consumption ceiling threshold set by the setting unit and notify the adjusting unit of a determination result; and the adjusting unit is configured to receive the determination result from the detecting unit, reduce power consumption of each device to the device power consumption ceiling threshold of the device when the current power consumption of the device in the device group exceeds the device power consumption ceiling threshold set by the setting unit, and when current power consumption of a device in the device group exceeds a device power consumption ceiling threshold set by the setting unit, set a new power consumption ceiling threshold for the device whose power consumption exceeds the device power consumption ceiling threshold and reduce power consumption of the device whose power consumption exceeds the device power consumption ceiling threshold to the new power consumption ceiling threshold or less than the new power consumption ceiling threshold.

In a first possible implementation of the second aspect, the detecting unit includes a first processing module and/or a second processing module, where: the first processing module is configured to use an SMM in the device group to detect a value of an electric current that passes through a circuit breaker and obtain the current total power consumption of the device group by a calculation according to the electric current value; and the second processing module is configured to establish a communications connection to a BMC of each device in the device group, read the current power consumption of each device in the device group from the BMC, and obtain the current total power consumption of the device group by accumulating the current power consumption of each device.

In a second possible implementation of the second aspect, the adjusting unit may be further configured to set, after receiving the determination result from the detecting unit and when current power consumption of a device in the device group exceeds a device power consumption ceiling threshold of the device, a new power consumption ceiling threshold for a remaining device to current power consumption of the device.

With reference to any one of the possible implementations of the second aspect, in a third possible implementation of the second aspect, the apparatus further includes: a resetting unit configured to set a second power consumption ceiling threshold for the device group, detect current total power consumption of the device group, and when the current total power consumption of the device group is less than or equal to the second power consumption ceiling threshold, terminate a power consumption adjustment operation.

With reference to any one of the possible implementations of the second aspect, in a fourth possible implementation of the second aspect, the apparatus further includes: a triggering unit configured to set a limiting switch for each device in the device group, and when current power consumption of a device in the device group exceeds a device power consumption ceiling threshold of the device, trigger a limiting switch of the device to perform a power consumption adjustment operation.

Evidently, with the method and apparatus provided by the present invention, multiple devices are grouped into at least one device group, a power consumption ceiling threshold is set for the device group and each device in the group, and the power consumption ceiling threshold is adjusted dynamically according to detected current power consumption of the device group and the devices in the device group. In this way, power resources can be allocated properly, resources can be shared by the devices in the device group, performance of heavily-loaded devices comes into full play without affecting lightly-loaded devices, and fast response to services is ensured. Moreover, because the power consumption ceiling threshold of each device may be dynamically adjusted according to actual power consumption, an initial power consumption ceiling threshold of each device is not necessarily set precisely. This ensures that load conditions and power consumption requirements of the devices are met as exactly as practicable, and a practical application of power consumption limiting is simplified.

BRIEF DESCRIPTION OF THE DRAWINGS

To illustrate the technical solutions in the embodiments of the present invention more clearly, the accompanying drawings required for describing the embodiments are introduced in the following. Apparently, the accompanying drawings in the following description show merely some embodiments of the present invention, and a person of ordinary skill in the art may still derive other drawings from these accompanying drawings without creative efforts.

DETAILED DESCRIPTION

The technical solutions in the embodiments of the present invention are clearly described in the following with reference to the accompanying drawings in the embodiments of the present invention. It is obvious that the embodiments to be described are only a part rather than all of the embodiments of the present invention. All other embodiments obtained by a person of ordinary skill in the art based on the embodiments of the present invention without creative efforts shall fall within the protection scope of the present invention.

Figure 1:
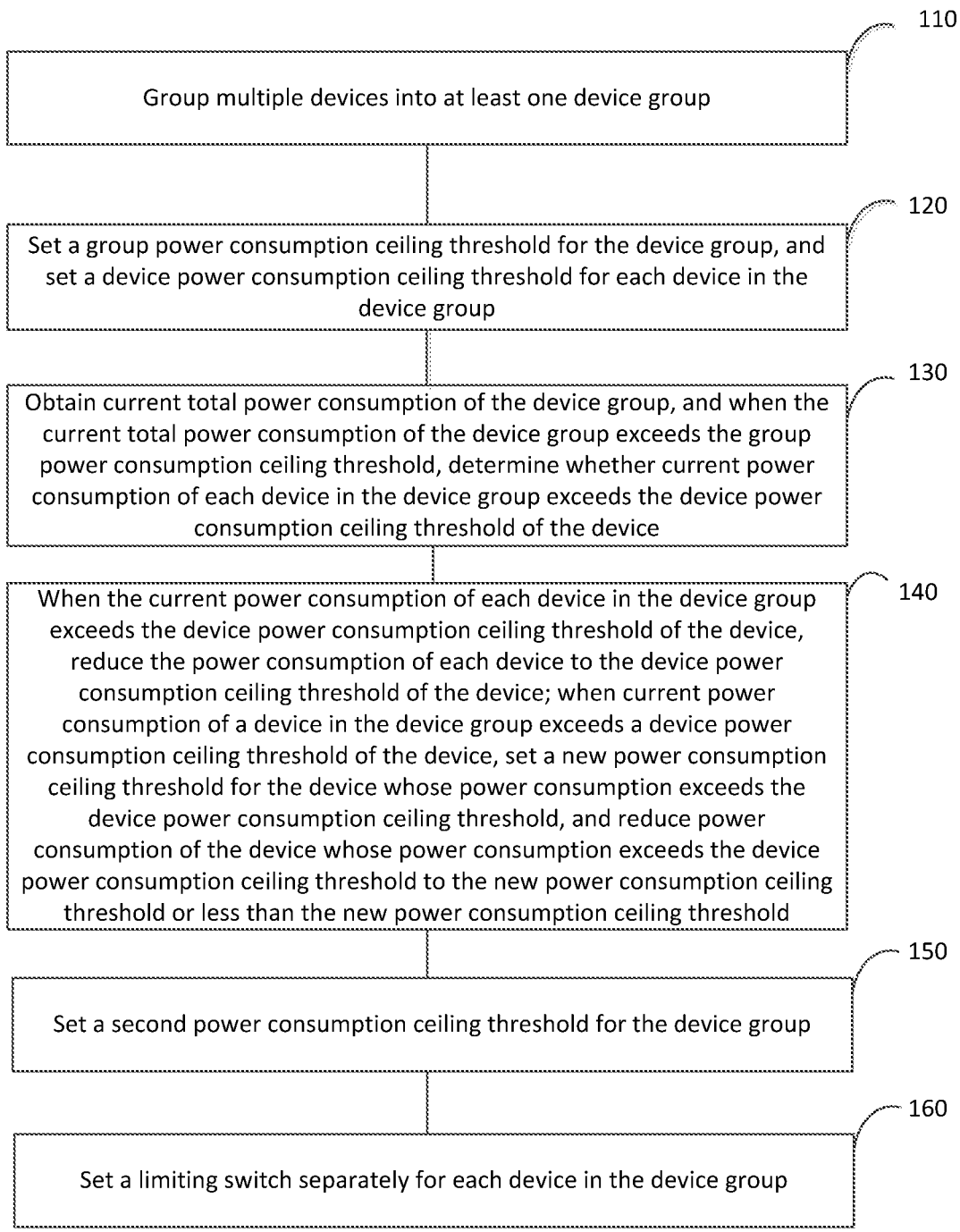
FIG. 1 is a schematic flowchart of a method for adjusting device power consumption according to an embodiment of the present invention.

An embodiment of the present invention provides a method for adjusting power consumption of a communications device. As shown in FIG. 1, the method includes:

Step 110: Group multiple devices into at least one device group.

In a practical application, multiple devices are grouped into at least one device group, a power supply is provided for each device group to supply power, and overcurrent protection is provided by a same circuit breaker for the device group. In addition, the multiple devices in the device group may be located in a same device rack or in different device racks.

Step 120: Set a group power consumption ceiling threshold for the device group, and set a device power consumption ceiling threshold for each device in the device group.

Specifically, during the execution of a device power budget, an SMM may be used to set the group power consumption ceiling threshold of the device group, where the SMM is responsible for communicating with a BMC of each device in the group and providing a management interface for receiving various external commands. In addition, the BMC of each device in the device group may also be used to set the device power consumption ceiling threshold of the device, and the BMC of each device performs a system management operation such as detection of a power, a temperature, a voltage, or a heartbeat. The group power consumption ceiling threshold and the device power consumption ceiling threshold may be stored in a non-volatile memory of the SMM and a non-volatile memory of the BMC respectively, and the SMM may also store the device power consumption ceiling threshold. Certainly, a person of ordinary skill in the art can easily understand that, in this embodiment, the group power consumption ceiling threshold may be set for the device group in another manner, and that the device power consumption ceiling threshold may be set for each device in the device group in another manner, which are not detailed herein.

Step 130: Obtain current total power consumption of the device group, and when the current total power consumption of the device group exceeds the group power consumption ceiling threshold, determine whether current power consumption of each device in the device group exceeds the device power consumption ceiling threshold of the device.

In this embodiment, the current total power consumption of the device group may be obtained in the following two ways, but without being limited to the following two ways: A. Use the SMM to detect a value of an electric current that passes through a circuit breaker and obtain the current total power consumption of the device group by a calculation according to the electric current value; and B. establish a communications connection to a BMC of each device in the device group, read current power consumption of each device in the device group from the BMC, and obtain the current total power consumption of the device group by accumulating the current power consumption of each device.

After the current total power consumption of the device group is obtained, the obtained total power consumption is compared with the set group power consumption ceiling threshold. If the current total power consumption of the device group is not greater than the group power consumption ceiling threshold, no processing is required. In this case, the device power consumption ceiling threshold of each device in the device group does not take effect, and each device in the device group may consume power corresponding to a load of the device, so as to give full play to its performance. If the current total power consumption of the device group is greater than the group power consumption ceiling threshold, it is necessary to determine whether the current power consumption of each device in the device group exceeds the device power consumption ceiling threshold, so as to perform a limiting operation based on an actual situation. Specifically, a determination result may be worked out by obtaining the current power consumption of each device and comparing the current power consumption of each device with the set device power consumption ceiling threshold. The detailed operations may be establishing a communications connection to a BMC of each device in the device group and reading the current power consumption of each device in the device group from the BMC, which are not detailed in this embodiment.

Step 140: When the current power consumption of each device in the device group exceeds the device power consumption ceiling threshold of the device, reduce the power consumption of each device to the device power consumption ceiling threshold of the device; when current power consumption of a device in the device group exceeds a device power consumption ceiling threshold of the device, set a new power consumption ceiling threshold for the device whose power consumption exceeds the device power consumption ceiling threshold, and reduce power consumption of the device whose power consumption exceeds the device power consumption ceiling threshold to the new power consumption ceiling threshold or less than the new power consumption ceiling threshold.

When the current power consumption of each device in the device group exceeds the device power consumption ceiling threshold of the device, a limiting operation needs to be performed, that is, the power consumption of each device needs to be reduced to the device power consumption ceiling threshold of the device without changing the original device power consumption ceiling threshold of the device. When the current power consumption of a device in the device group exceeds a device power consumption ceiling threshold of the device, it indicates that the current threshold of the device whose current power consumption exceeds the device power consumption ceiling threshold is too low. Therefore, according to this embodiment, a new power consumption ceiling threshold needs to be set for the device, where the new power consumption ceiling threshold is usually greater than the original power consumption ceiling threshold, that is, the new power consumption ceiling threshold allows the device to execute various kinds of processing at higher power, ensuring full play of performance of all devices. For a remaining device whose current power consumption does not exceed the device power consumption ceiling threshold of the remaining device, no matter whether its current power consumption is less than or equal to the device power consumption ceiling threshold, a new power consumption ceiling needs to be set for the device whose current power consumption is less than the device power consumption ceiling threshold, for example, the new power consumption ceiling threshold is set to the current power consumption of the device, which is not detailed in this embodiment.

It should be noted that in this embodiment, the device power consumption may be reduced in another manner provided in the prior art. The specific adjustment process is not detailed herein.

In addition, in this embodiment, a new power consumption ceiling threshold may be set for a device that exceeds a device power consumption ceiling threshold in the following way, but without being limited to the following way: It is assumed that a device group includes m+n devices in total. In the device group, current power consumption of m devices exceeds a device power consumption ceiling threshold $Y_i$ (i=1, 2, . . . , m) of the m devices, and a power consumption excess is $P_1, P_2, \ldots, P_m$ respectively, equal to a difference between the current power consumption of each of the devices and the device power consumption ceiling threshold $Y_i$. In addition, in the device group, current power consumption of n devices does not exceed a device power consumption ceiling threshold of the n devices, and a power consumption shortfall is $Q_1, Q_2, \ldots, Q_n$ respectively, equal to a difference between the device power consumption ceiling threshold and the current power consumption of each of the devices. A new power consumption ceiling threshold of a device that exceeds the device power consumption ceiling threshold may be obtained by using a formula $X_i=Y_i+P_i*Q/P$, where $Y_i$ is an original device power consumption ceiling threshold of device i, $P_i$ is a power consumption excess of device i (i=1, 2, . . . , m), P is a sum of power consumption excesses of m devices whose current power consumption exceeds the device power consumption ceiling threshold ($P=P_1+P_2+ \ldots +P_m$) of the m devices, and Q is a sum of power consumption shortfalls of n devices whose current power consumption is less than the device power consumption ceiling threshold ($Q=Q_1+Q_2+ \ldots +Q_n$) of the n devices.

After each power consumption value in the foregoing embodiment is adjusted, that is, after a limiting operation is completed, the total power consumption of the device group stays below the group power consumption ceiling threshold, and all devices go on running. However, after a service load of each device decreases gradually, the total power consumption of the device group also decreases synchronously. If the new device power consumption ceiling threshold remains effective all along after the limiting operation, normal running of a device may be affected. Therefore, based on the foregoing embodiment, another embodiment of the present invention discloses a method for adjusting power consumption of a communications device. Basic operation steps of this method are the same as operation steps of the method described in the foregoing embodiment, but differently, the method in this embodiment further includes:

Step 150: Set a second power consumption ceiling threshold for the device group, obtain current total power consumption of the device group, and when the current total power consumption of the device group is less than or equal to the second power consumption ceiling threshold, terminate a power consumption adjustment operation. The second power consumption ceiling threshold may be user-defined according to typical power consumption of a device, for example, set to 80% of the group power consumption ceiling threshold. Certainly, a person of ordinary skill in the art can easily understand that, in this embodiment, a manner of obtaining the current total power consumption of the device group may be the same as a manner of obtaining the current total power consumption of the device group as described in the foregoing embodiment, and is not repeated herein.

In addition, based on the foregoing embodiments, the method for adjusting device power consumption according to the present invention may further include:

Step 160: Set a limiting switch separately for each device in the device group; when current total power consumption of the device group exceeds the group power consumption ceiling threshold and current power consumption of a device in the device group exceeds a device power consumption ceiling threshold of the device, trigger a limiting switch of the device to perform a power consumption adjustment operation; in a practical operation, store a limiting operation enabling bit set by an SMM in a BMC of the device in the device group, where the enabling bit is 0 by default, which means disabling power consumption limiting for the device; and when current power consumption of a device in the device group exceeds a device power consumption ceiling threshold of the device, the enabling bit is set to 1, which means enabling power consumption limiting to adjust power consumption of the device.

The method for adjusting device power consumption in the foregoing embodiment is described in detail by using a specific instance below. The method includes:

S210. Group five devices into one device group. For ease of description in this embodiment, it is assumed that typical power consumption of each of the five devices is 100 W, and that the devices are grouped into one device group.

S220. Set a group power consumption ceiling threshold of the device group formed of the five devices to 500 W, and set a device power consumption ceiling threshold of each device in the device group to 100 W.

S230. When it is known by detection that current total power consumption of the device group is 520 W which is greater than the group power consumption ceiling threshold of 500 W of the device group, determine whether current power consumption of each device in the device group exceeds a device power consumption ceiling threshold of 100 W of the device.

S240. It is known by detection that current power consumption of the five devices in the device group is 80, 50, 100, 160, and 130 respectively. Table 1 shows a comparison between the current power consumption of the five devices in the device group and the device power consumption ceiling threshold.

TABLE 1

| | Device | | | | |
|---|---|---|---|---|---|
| | Device 1 | Device 2 | Device 3 | Device 4 | Device 5 |
| Power Consumption (W) | 80 | 50 | 100 | 160 | 130 |
| Ceiling (W) | 100 | 100 | 100 | 100 | 100 |

Because the current power consumption of device 1, device 2, and device 3 in the device group does not exceed the device power consumption ceiling thresholds of the device 1, device 2, and device 3, new power consumption ceiling thresholds of the three devices are set to the current power consumption of the three devices. That is, a new power consumption ceiling threshold of device 1 is 80 W, a new power consumption ceiling threshold of device 2 is 50 W, and a new power consumption ceiling threshold of device 3 is 100 W. Because the current power consumption of device 4 and device 5 in the device group exceeds the device power consumption ceiling thresholds of the device 4 and device 5, a new power consumption ceiling threshold may be set for device 4 and device 5 by using the following formula:

A new power consumption ceiling threshold of device 4 is $X_4=Y_4+P_4*Q/P=100+(160-100)*(100-80+100-50)/(160-100+130-100)=100+60*70/90=147$ W; and a new power consumption ceiling threshold of device 5 is $X_5=Y_5+P_5*Q/P=100+(130-100)*(100-80+100-50)/(160-100+130-100)=100+30*70/90=123$ W.

S250. After the new power consumption ceiling threshold is set for each device in the device group, perform a limiting operation for device 4 and device 5 that exceed the device power consumption ceiling thresholds of the device 4 and device 5, that is, reduce their power consumption to their new power consumption ceiling thresholds 147 W and 123 W respectively. Table 2 shows a comparison between the new power consumption ceiling thresholds and the current power consumption of each device in the device group after the limiting operation is performed for device 4 and device 5.

TABLE 2

| | Device | | | | |
|---|---|---|---|---|---|
| | Device 1 | Device 2 | Device 3 | Device 4 | Device 5 |
| Power Consumption (W) | 80 | 50 | 100 | 147 | 123 |
| Ceiling (W) | 80 | 50 | 100 | 147 | 123 |

As can be seen from Table 2, after the power consumption ceiling threshold of each device in the device group is adjusted and the limiting operation is performed, the total power consumption of the devices in the device group is still 500 W, so that the originally allocated power budget is fully used; in addition, the new power consumption ceiling thresholds of device 4 and device 5 are closer to the power consumption existent before the limiting operation, without affecting device 1, device 2, and device 3, thereby giving full play to device performance. Although the power consumption ceiling thresholds of device 1 and device 2 are lowered and their future performance will be affected before the limiting operation is canceled, their load is relatively low when the limiting operation starts, and devices, such as device 4 and device 5, in an urgent need to process a load have a higher priority and their performance should be ensured first. In this way, even if a new service arrives, the new service may be transferred to another device group, thereby ensuring that processing of an ongoing service is not affected.

Evidently, with the method provided by the embodiment of the present invention, multiple devices are grouped into at least one device group, a power consumption ceiling threshold is set for the device group and each device in the group, and the power consumption ceiling threshold is adjusted dynamically according to detected current power consumption of the device group and the devices in the group. In this way, power resources can be allocated properly, resources can be shared by the devices in the device group, performance of heavily-loaded devices comes into full play without affecting lightly-loaded devices, and fast response to services is ensured. Moreover, because the power consumption ceiling threshold of each device may be dynamically adjusted according to actual power consumption, an initial power consumption ceiling threshold of each device is not necessarily set precisely. This ensures that load conditions and power consumption requirements of the devices are met as exactly as practicable, and a practical application of power consumption limiting is simplified.

Figure 2:
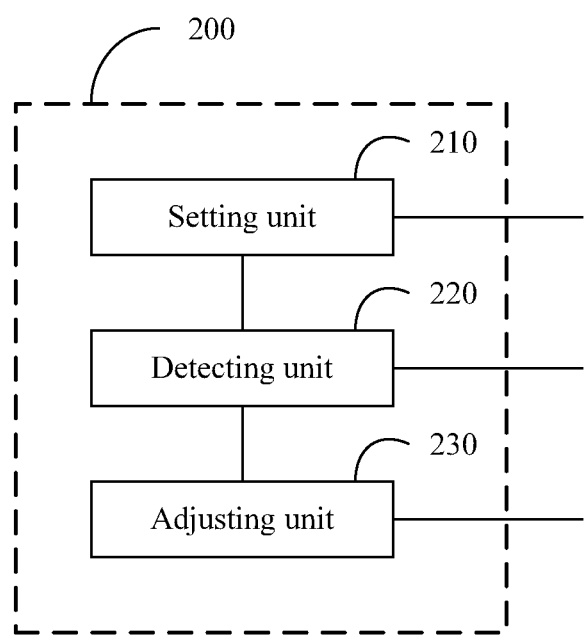
FIG. 2 is a schematic structural diagram of an apparatus for adjusting device power consumption according to an embodiment of the present invention.

Based on a same concept as what is described above, another embodiment of the present invention provides an apparatus for adjusting device power consumption. As shown in FIG. 2, the apparatus 200 includes: a setting unit 210, a detecting unit 220, and an adjusting unit 230.

The setting unit 210 is configured to group multiple devices into at least one device group, set a group power consumption ceiling threshold for the device group, and set a device power consumption ceiling threshold for each device in the device group; the detecting unit 220 is configured to obtain current total power consumption of the device group, and when the current total power consumption of the device group exceeds the group power consumption ceiling threshold set by the setting unit 210, determine whether current power consumption of each device in the device group exceeds the device power consumption ceiling threshold set by the setting unit 210 and notify the adjusting unit 230 of a determination result; and the adjusting unit 230 is configured to receive the determination result from the detecting unit 220, reduce power consumption of each device to the device power consumption ceiling threshold of the device when the current power consumption of each device in the device group exceeds the device power consumption ceiling threshold set by the setting unit 210, and when current power consumption of a device in the device group exceeds a device power consumption ceiling threshold set by the setting unit 210, set a new power consumption ceiling threshold for the device whose power consumption exceeds the device power consumption ceiling threshold and reduce power consumption of the device whose power consumption exceeds the device power consumption ceiling threshold to the new power consumption ceiling threshold or less than the new power consumption ceiling threshold.

The detecting unit 220 includes (not shown in the figure): a first processing module and/or a second processing module, where: the first processing module is configured to use an SMM in the device group to detect a value of an electric current that passes through a circuit breaker and obtain the current total power consumption of the device group by a calculation according to the electric current value; and the second processing module is configured to establish a communications connection to a BMC of each device in the device group, read the current power consumption of each device in the device group from the BMC, and obtain the current total power consumption of the device group by accumulating the current power consumption of each device.

In addition, the adjusting unit 230 may be further configured to set, after receiving the determination result from the detecting unit 220 and when current power consumption of a device in the device group exceeds a device power consumption ceiling threshold of the device, a new power consumption ceiling threshold for a remaining device to current power consumption of the remaining device.

It should be noted that the apparatus 200 may further include (not shown in the figure) a resetting unit configured to: set a second power consumption ceiling threshold for the device group, detect current total power consumption of the device group, and when the current total power consumption of the device group is less than or equal to the second power consumption ceiling threshold, terminate a power consumption adjustment operation.

In addition, the apparatus 200 may further include (not shown in the figure) a triggering unit configured to: set a limiting switch separately for each device in the device group; when current power consumption of a device in the device group exceeds a device power consumption ceiling threshold of the device, trigger a limiting switch of the device to perform a power consumption adjustment operation; in a practical operation, store a limiting operation enabling bit set by an SMM in a BMC of the device in the device group, where the enabling bit is 0 by default, which means disabling power consumption limiting for the device; and when current power consumption of a device in the device group exceeds a device power consumption ceiling threshold of the device, the enabling bit is set to 1, which means enabling power consumption limiting to adjust power consumption of the device.

A person skilled in the art can further appreciate that the various units and algorithm steps in illustrations described with reference to the embodiments disclosed herein can be implemented by electronic hardware, computer software, or a combination of both. To clearly illustrate the interchangeability of hardware and software, various illustrative methods, steps and apparatuses have been described above generally in terms of their functions. Whether the functions are executed by hardware or software depends on a specific application of the technical solutions and a constraint condition of the design. A person skilled in the art may use different methods to implement the described functions for each particular application, but it should not be considered that the implementation goes beyond the scope of the embodiments of the present invention.

The steps of the method or algorithm described with reference to the embodiments disclosed herein can be implemented directly by hardware, by a software module executed by a processor, or by a combination of the two.

The foregoing descriptions of the disclosed embodiments enable a person skilled in the art to implement or use the embodiments of the invention. Various modifications of the embodiments are apparent to a person skilled in the art, and general principles defined herein can be implemented in other embodiments without departing from the spirit or scope of the invention. Therefore, the present invention is not limited to the exemplary embodiments given herein, but is to be accorded the widest scope consistent with the principles and novelty features disclosed herein.

The foregoing descriptions are merely exemplary embodiments of the present invention, but are not intended to limit the present invention. Any modifications, equivalent replacements, improvements, and the like made within the spirit and principle of the embodiments of the present invention shall fall within the protection scope of the embodiments of the present invention.

What is claimed is:

1. A method for adjusting device power consumption, comprising:
   grouping multiple devices into at least one device group;
   setting a group power consumption ceiling threshold for the device group;
   setting a device power consumption ceiling threshold for each device in the device group;
   obtaining current total power consumption of the device group;
   determining whether current power consumption of each device in the device group exceeds the device power consumption ceiling threshold of the device when the current total power consumption of the device group exceeds the group power consumption ceiling threshold;
   reducing power consumption of each device to the device power consumption ceiling threshold of the device when the current power consumption of each device in the device group exceeds the device power consumption ceiling threshold of the device;
   setting a new power consumption ceiling threshold for a device whose power consumption exceeds a device power consumption ceiling threshold when current power consumption of the device in the device group exceeds the device power consumption ceiling threshold of the device; and
   reducing power consumption of the device whose power consumption exceeds the device power consumption ceiling threshold to the new power consumption ceiling threshold or less than the new power consumption ceiling threshold,
   wherein the new power consumption ceiling threshold of the device whose power consumption exceeds the device power consumption ceiling threshold is obtained by a calculation by using a formula:

$$Xi = Yi + Pi * Q/P,$$

wherein Yi is an original device power consumption ceiling threshold of device i,
   wherein Pi is a difference between current power consumption of device i and the original device power consumption ceiling threshold,
   wherein i=1, 2, ..., m; P is a sum of power consumption excesses of m devices whose current power consumption exceeds a device power consumption ceiling threshold of the m devices,
   wherein P=P1+P2+ ... +Pm; Q is a sum of power consumption shortfalls of n devices whose current power consumption is less than a device power consumption ceiling threshold of the n devices, wherein Q=Q1+Q2+ . . . +Qn,
wherein Qj is a difference between the original device power consumption ceiling threshold of device j and the current power consumption, and
wherein j=1, 2, . . . , n.

2. The method according to claim 1, wherein a system management module (SMM) in the device group is used to set the group power consumption ceiling threshold of the device group, and wherein a baseboard management controller (BMC) of each device in the device group is used to set the device power consumption ceiling threshold for the device.

3. The method according to claim 1, wherein obtaining the current total power consumption of the device group specifically comprises:
using a system management module (SMM) in the device group to detect a value of an electric current that passes through a circuit breaker; and
obtaining the current total power consumption of the device group by a calculation according to the electric current value.

4. The method according to claim 1, wherein obtaining the current total power consumption of the device group specifically comprises:
establishing a communications connection to a baseboard management controller (BMC) of each device in the device group;
reading the current power consumption of each device in the device group from the BMC; and
obtaining the current total power consumption of the device group by accumulating the current power consumption of each device.

5. The method according to claim 1, further comprising setting a new power consumption ceiling threshold for a remaining device to current power consumption of the remaining device when the current power consumption of a device in the device group exceeds a device power consumption ceiling threshold of the device.

6. The method according to claim 1, wherein after setting the new power consumption ceiling threshold for the device, the method further comprises:
setting a second power consumption ceiling threshold for the device group;
detecting current total power consumption of the device group; and
terminating a power consumption adjustment operation when the current total power consumption of the device group is less than or equal to the second power consumption ceiling threshold.

7. The method according to claim 1, further comprising:
setting a limiting switch separately for each device in the device group; and
triggering a limiting switch of a device to perform a power consumption adjustment operation when current power consumption of the device in the device group exceeds a device power consumption ceiling threshold of the device.

8. An apparatus for adjusting device power consumption, comprising:
a setting unit;
a detecting unit coupled to the setting unit; and
an adjusting unit coupled to the detecting unit,
wherein the setting unit is configured to group multiple devices into at least one device group, set a group power consumption ceiling threshold for the device group, and set a device power consumption ceiling threshold for each device in the device group,
wherein the detecting unit is configured to obtain current total power consumption of the device group, and when the current total power consumption of the device group exceeds the group power consumption ceiling threshold set by the setting unit, determine whether current power consumption of each device in the device group exceeds the device power consumption ceiling threshold set by the setting unit, and notify the adjusting unit of a determination result,
wherein the adjusting unit is configured to receive the determination result from the detecting unit, reduce power consumption of each device to the device power consumption ceiling threshold of the device when the current power consumption of each device in the device group exceeds the device power consumption ceiling threshold set by the setting unit, and when current power consumption of a device in the device group exceeds a device power consumption ceiling threshold set by the setting unit, set a new power consumption ceiling threshold for the device whose power consumption exceeds the device power consumption ceiling threshold and reduce power consumption of the device whose power consumption exceeds the device power consumption ceiling threshold to the new power consumption ceiling threshold or less than the new power consumption ceiling threshold,
wherein the new power consumption ceiling threshold of the device whose power consumption exceeds the device power consumption ceiling threshold is obtained by a calculation by using a formula:

$$Xi=Yi+Pi*Q/P,$$

wherein Yi is an original device power consumption ceiling threshold of device i,
wherein Pi is a difference between current power consumption of device i and the original device power consumption ceiling threshold,
wherein i=1, 2, . . . , m; P is a sum of power consumption excesses of m devices whose current power consumption exceeds a device power consumption ceiling threshold of the m devices,
wherein P=P1+P2+ . . . +Pm; Q is a sum of power consumption shortfalls of n devices whose current power consumption is less than a device power consumption ceiling threshold of the n devices,
wherein Q=Q1+Q2+ . . . +Qn,
wherein Qj is a difference between the original device power consumption ceiling threshold of device j and the current power consumption, and
wherein j=1, 2, . . . , n.

9. The apparatus according to claim 8, wherein the detecting unit comprises a first processing module and/or a second processing module, wherein the first processing module is configured to use a system management module (SMM) in the device group to detect a value of an electric current that passes through a circuit breaker and obtain the current total power consumption of the device group by a calculation according to the electric current value, and wherein the second processing module is configured to establish a communications connection to a baseboard management controller (BMC) of each device in the device group, read the current power consumption of each device in the device group from the BMC, and obtain the current total power consumption of the device group by accumulating the current power consumption of each device.

10. The apparatus according to claim 8, wherein the adjusting unit is further configured to set, after receiving the determination result from the detecting unit and when current power consumption of a device in the device group exceeds a device power consumption ceiling threshold of the device, a new power consumption ceiling threshold of a remaining device to current power consumption of the remaining device.

11. The apparatus according to claim 8, further comprising a resetting unit configured to set a second power consumption ceiling threshold for the device group, detect current total power consumption of the device group, and when the current total power consumption of the device group is less than or equal to the second power consumption ceiling threshold, terminate a power consumption adjustment operation.

12. The apparatus according to claim 8, further comprising a triggering unit configured to set a limiting switch for each device in the device group, and when current power consumption of a device in the device group exceeds a device power consumption ceiling threshold of the device, trigger a limiting switch of the device to perform a power consumption adjustment operation.

13. A non-transitory computer-readable medium having computer usable instructions stored thereon for execution by a processor, wherein the instructions cause the processor to:
    group multiple devices into at least one device group;
    set a group power consumption ceiling threshold for the device group;
    set a device power consumption ceiling threshold for each device in the device group;
    obtain current total power consumption of the device group;
    determine whether current power consumption of each device in the device group exceeds the device power consumption ceiling threshold of the device when the current total power consumption of the device group exceeds the group power consumption ceiling threshold;
    reduce power consumption of each device to the device power consumption ceiling threshold of the device when the current power consumption of each device in the device group exceeds the device power consumption ceiling threshold of the device;
    set a new power consumption ceiling threshold for a device whose power consumption exceeds a device power consumption ceiling threshold when current power consumption of the device in the device group exceeds the device power consumption ceiling threshold of the device; and
    reduce power consumption of the device whose power consumption exceeds the device power consumption ceiling threshold to the new power consumption ceiling threshold or less than the new power consumption ceiling threshold,
    wherein the new power consumption ceiling threshold of the device whose power consumption exceeds the device power consumption ceiling threshold is obtained by a calculation by using a formula:

$$Xi = Yi + Pi * Q/P,$$

wherein $Yi$ is an original device power consumption ceiling threshold of device $i$,
    wherein $Pi$ is a difference between current power consumption of device $i$ and the original device power consumption ceiling threshold,
    wherein $i=1, 2, \ldots, m$; P is a sum of power consumption excesses of m devices whose current power consumption exceeds a device power consumption ceiling threshold of the m devices,
    wherein $P=P1+P2+\ldots+Pm$; Q is a sum of power consumption shortfalls of n devices whose current power consumption is less than a device power consumption ceiling threshold of the n devices,
    wherein $Q=Q1+Q2+\ldots+Qn$,
    wherein $Qj$ is a difference between the original device power consumption ceiling threshold of device $j$ and the current power consumption, and
    wherein $j=1, 2, \ldots, n$.

14. The non-transitory computer-readable medium according to claim 13, wherein a system management module (SMM) in the device group is used to set the group power consumption ceiling threshold of the device group, and wherein a baseboard management controller (BMC) of each device in the device group is used to set the device power consumption ceiling threshold for the device.

15. The non-transitory computer-readable medium according to claim 13, wherein the instructions to obtain the current total power consumption of the device group specifically comprise instructions to:
    use a system management module (SMM) in the device group to detect a value of an electric current that passes through a circuit breaker; and
    obtain the current total power consumption of the device group by a calculation according to the electric current value.

16. The non-transitory computer-readable medium according to claim 13, wherein the instructions to obtain the current total power consumption of the device group specifically comprise instructions to:
    establish a communications connection to a baseboard management controller (BMC) of each device in the device group;
    read the current power consumption of each device in the device group from the BMC; and
    obtain the current total power consumption of the device group by accumulating the current power consumption of each device.

17. The non-transitory computer-readable medium according to claim 13, wherein the instructions further cause the processor to set a new power consumption ceiling threshold for a remaining device to current power consumption of the remaining device when the current power consumption of a device in the device group exceeds a device power consumption ceiling threshold of the device.

18. The non-transitory computer-readable medium according to claim 13, wherein after the new power consumption ceiling threshold is set for the device, the instructions further cause the processor to:
    set a second power consumption ceiling threshold for the device group;
    detect current total power consumption of the device group; and
    terminate a power consumption adjustment operation when the current total power consumption of the device group is less than or equal to the second power consumption ceiling threshold.

* * * * *

UNITED STATES PATENT AND TRADEMARK OFFICE
CERTIFICATE OF CORRECTION

| | | |
|---|---|---|
| PATENT NO. | : 9,207,744 B2 | Page 1 of 1 |
| APPLICATION NO. | : 14/088880 | |
| DATED | : December 8, 2015 | |
| INVENTOR(S) | : Li et al. | |

It is certified that error appears in the above-identified patent and that said Letters Patent is hereby corrected as shown below:

On the title page item [30] should read:

Oct. 18, 2012    (CN) ........................... 201210397346.0

Signed and Sealed this
Twenty-ninth Day of March, 2016

Michelle K. Lee
*Director of the United States Patent and Trademark Office*